(12) United States Patent
Agarwal et al.

(10) Patent No.: US 10,439,916 B2
(45) Date of Patent: *Oct. 8, 2019

(54) CLIENT-SIDE FAULT TOLERANCE IN A PUBLISH-SUBSCRIBE SYSTEM

(71) Applicant: International Business Machines Corporation, Armonk, NY (US)

(72) Inventors: Kanak B. Agarwal, Austin, TX (US); Patrick J. Bohrer, Cedar Park, TX (US); Ahmed Gheith, Austin, TX (US); Michael D. Kistler, Austin, TX (US); Ramakrishnan Rajamony, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 35 days.

This patent is subject to a terminal disclaimer.

(21) Appl. No.: 15/617,379

(22) Filed: Jun. 8, 2017

(65) Prior Publication Data

US 2017/0272346 A1    Sep. 21, 2017

Related U.S. Application Data

(63) Continuation of application No. 14/639,351, filed on Mar. 5, 2015, now Pat. No. 9,742,651.

(51) Int. Cl.
*G06F 15/16* (2006.01)
*H04L 12/26* (2006.01)
*H04L 29/08* (2006.01)

(52) U.S. Cl.
CPC ............ *H04L 43/10* (2013.01); *H04L 67/145* (2013.01); *H04L 67/26* (2013.01)

(58) Field of Classification Search
CPC .......... H04L 43/10; H04L 69/28; H04L 67/42; H04L 67/26; H04L 67/145
(Continued)

(56) References Cited

U.S. PATENT DOCUMENTS

| 63,934,581 | | 4/1999 | Gigliotti Samuel et al. |
| 6,393,458 | B1 | 5/2002 | Gigliotti et al. |

(Continued)

FOREIGN PATENT DOCUMENTS

| CN | 101681489 A | 5/2008 |
| CN | 101650741 A | 8/2009 |

(Continued)

OTHER PUBLICATIONS

P2S: A fault-Tolerant Publish-Suscribe Infrastructure by Tiancheng Chang et al. DEBS '14, May 26-29, 2014, Mumbai, India.*

(Continued)

*Primary Examiner* — Frantz B Jean
(74) *Attorney, Agent, or Firm* — Garg Law Firm, PLLC; Rakesh Garg; Mercedes L. Hobson (57) ABSTRACT

To provide client-side fault-tolerance in a publish-subscribe system, a message is received on a channel from a server. At a function executing using a processor and a memory, a determination is made whether the message contains a heartbeat data. When the message contains the heartbeat data, a determination is made whether a content signature contained in the message matches a last known content signature saved from a previous message. When the content signature contained in the message does not match the last known content signature saved from a previous message, a refresh message is sent to the channel.

20 Claims, 5 Drawing Sheets

(58) Field of Classification Search
USPC .................................................. 709/203, 206
See application file for complete search history.

(56) References Cited

U.S. PATENT DOCUMENTS

| | | | | |
|---|---|---|---|---|
| 6,772,196 | B1* | 8/2004 | Kirsch | G06Q 10/107 |
| | | | | 707/999.005 |
| 7,577,656 | B2* | 8/2009 | Kawai | G06Q 10/107 |
| 2002/0023221 | A1* | 2/2002 | Miyazaki | G06F 21/64 |
| | | | | 713/178 |
| 2002/0165815 | A1 | 11/2002 | Vincent | |
| 2007/0143619 | A1* | 6/2007 | Goodman | G06F 21/606 |
| | | | | 713/176 |
| 2011/0225229 | A1 | 9/2011 | Srivastava et al. | |
| 2013/0024528 | A1 | 1/2013 | Gallant et al. | |
| 2013/0297737 | A1 | 11/2013 | Tarkoma | |

FOREIGN PATENT DOCUMENTS

| | | |
|---|---|---|
| CN | 101692656 A | 10/2009 |
| CN | 10650741 A | 2/2010 |
| CN | 101681489 A | 3/2010 |
| CN | 101692656 A | 4/2010 |
| CN | 103404087 A | 2/2011 |
| CN | 103220328 A | 3/2013 |
| CN | 103220328 A | 7/2013 |
| CN | 103404087 A | 11/2013 |

OTHER PUBLICATIONS

Appendix P, 2017.
List of IBM Patents or Applications Treated as Related, 2018.
Wan Ho et al., Design and Implementation of Middleware System Based on Publish Subscribe Mechanism, 2012.
Venugopalan Ramasubramanian et al., Corona: A High Performance Publish-Subscribe System for the World Wide Web, May 8, 2006.
AUS920140488CN1, Non final Office action, dated Oct. 10, 2018.

* cited by examiner

CLIENT-SIDE FAULT TOLERANCE IN A PUBLISH-SUBSCRIBE SYSTEM

TECHNICAL FIELD

The present invention relates generally to a method, system, and computer program product for managing data requests and responses. More particularly, the present invention relates to a method, system, and computer program product for client-side fault-tolerance in a publish-subscribe system.

BACKGROUND

Most data communications between two data processing systems involve a request for data and a response containing the requested data. For example, a client data processing system requests data by sending a request message using HyperText Transfer Protocol (http or HTTP) to a server data processing system. The server, using HTTP, sends a response message containing the data to the client.

A client can request data updates on an ongoing basis. For example, in a client-server environment using live query type of requests, a client essentially subscribes to an ongoing feed of data updates from a server-side, or backend, data processing environment. Live query, also known as dynamic query or continuous query, is a method by which a client requests ongoing updates on an event or state of something.

A simple example of live query is a request from a browser to live stock price of a stock ticker, where in response to such a query, a server supplies the browser ongoing updates of the changing stock price of that ticker. To provide ongoing updates in response to a request, a server typically monitors the changes in a database or the changes in the state of an event. The server may monitor these changes by polling the database or periodically observing the event for any changes from previous data in the database or from the previous state of the event.

HTTP protocol only supports a request-response model where clients initiate the requests and the servers respond to the client requests. In the standard HTTP model, a server cannot push responses back to a client without a corresponding request pending from the client. In a live query type publish-subscribe system, servers directly push the content back to clients. This type of operation can be achieved through a protocol, such as websockets, that supports bi-directional communication between client and server.

In a client-server model where clients subscribe to such dynamic content feed generated by the servers, multiple servers can be used for load balancing. One form of load balancing to support horizontal scaling is to use independent servers where the servers are not aware of what other servers are doing for the same or different clients. In a server-side data processing environment, where multiple independent servers with no shared state information about each other operate together to serve numerous requests from numerous clients, an incoming request from a client for subscribing or unsubscribing from receiving such data updates can be routed to any server for processing.

SUMMARY

The illustrative embodiments provide a method, system, and computer program product for client-side fault-tolerance in a publish-subscribe system. An embodiment includes a method for client-side fault-tolerance in a publish-subscribe system. The embodiment receives, on a channel, a message from a server. The embodiment determines, at a function executing using a processor and a memory, whether the message contains a heartbeat data. The embodiment determines, responsive to the message containing the heartbeat data, whether a content signature contained in the message matches a last known content signature saved from a previous message. The embodiment sends a refresh message to the channel, responsive to the content signature contained in the message not matching the last known content signature saved from a previous message.

Another embodiment includes a computer usable program product comprising a computer readable storage device including computer usable code for client-side fault-tolerance in a publish-subscribe system.

Another embodiment includes a data processing system for client-side fault-tolerance in a publish-subscribe system.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

The illustrative embodiments recognize that in a client-server environment where clients subscribe to data feeds, a failure on the server-side can leave a client with out-of-sync updates or even waiting indefinitely for the data. For example, a server that is providing the updates to a client may fail, causing the client to remain in wait for new updates.

As another example, a messaging middleware, through which the server publishes the updates and the client subscribes to such updates, may fail. The client may miss a published update if the messaging middleware fails after the server has published the update.

Restoring a failed backend operation is highly implementation specific. When a backend server fails, there is no guarantee that another server will assume the query processing and continue to provide the updates to the client subscribers. Even when a failed server is restored, there is no guarantee that the server will resume any processing from before the failure. Even if a failed messaging middleware is restored, there is no guarantee that a publication from before the failure will be restored and delivered to the subscribers.

The illustrative embodiments used to describe the invention generally address and solve the above-described problems and other problems related to managing data requests and responses. The illustrative embodiments provide a method, system, and computer program product for scalable and self-healing architecture for client-side fault-tolerance in a publish-subscribe system.

The embodiments described herein are adaptable to other types or requests and responses using HTTP or other protocols. The embodiments described herein are also adaptable for use not only with mobile devices but also with other data processing system and environments where the publish-subscribe model for client-server communications can be used.

In some embodiments, a requestor system is described as a client and a responding system is described as a server without implying any particular client-server configuration or architecture. A client is simply a consumer of data and a server is simply a supplier of data, and a system that is a client in one exchange could very well be the server (or backend) in another exchange, and vice versa. Typically, servers operate in a backend data processing environment and are accessed over a data network from applications executing at client systems. The backend data processing environment—also referred to herein as the server-side data processing environment—comprises applications and systems to receive the data requests, repositories of data from which to provide data in response, applications whose services are requested in some requests, security applications, middleware applications and platforms, and many other systems and applications.

An embodiment can be implemented as an application in software, hardware, or firmware, to operate in the backend data processing environment. Some operations of some embodiments described herein can be implemented in a server, such as by modifying a server application to perform those operations. Generally, within the scope of the illustrative embodiments, the operations and functions of an embodiment can be implemented in a stand-alone manner or in conjunction with other applications executing in the backend data processing environment. For example, an application implementing an embodiment can be configured to operate as a modification of a client application—such as a browser or another requestor application, a stand-alone application usable by a client application, a library of functions that can be called by another application executing at the client, or some combination thereof.

In operation, typically, several servers in a load-sharing configuration provide the same type of service to numerous clients. Each load-sharing server operating in such a publish-subscribe client-server architecture is capable of establishing a channel, publishing content—including ongoing updates—to that channel, and binding clients to listen to the content published on the channel.

The server establishes the channel based on the query or type of request (hereinafter referred to as "query") from the client. Essentially, within the scope of the illustrative embodiments, a channel is simple a manner of establishing correspondence between a query and the published content. For example, assume that the query has an identifier. A server uses the query identifier as a channel identifier. Publishing content to the channel includes identifying the content with the identifier so that a client listening to the channel can establish the correspondence between the query and the content.

In some cases, the request message specifies the query identifier and the server uses the specified identifier of the specified query as a channel identifier. In some other cases, the request message specifies the query and the server uses a suitable method to determine an identifier of the specified query, such as by generating a hash value of the query or by looking up the query in a catalog. The server then uses the determined query identifier as a channel identifier.

A server can then bind the requesting client to listen to updates published on the channel. A client that is bound to a channel receives the content that is published on that channel without having to poll or send a request for the content. A messaging middleware maintains a session queue for a client. The binding of the client to a channel comprises configuring a path in the middleware such that content published with the channel identifier can be placed in the client's session queue.

A client initiates a data communication session by sending a handshake message to a backend data processing environment. The backend data processing environment implements one or more agent applications, one of which establishes a session identifier for the session and responds to the client's handshake message. For the remainder of the data communications between the client and the backend, the client is expected to use the session identifier.

Using the session identifier, the client sends a request, such as a request for data and ongoing updates, to the backend data processing environment. An agent determines from the message header the query in the request. For example, one request may ask for a database service where a database has to provide updates on some changing data in response. As another example, another request may ask for a news or stock feed service where a server application may have to access a data source to obtain and supply the data and the updates. As another example, a request may ask for a notification service where a backend application has to supply information of an event when changes in the event are detected. Many other types of services can similarly be the subject of the query in a request message.

A message-oriented middleware is any suitable application that enables two or more applications to communicate with each other via message queues (MQ). A variety of message-oriented middleware, also referred to herein as messaging middleware or MQ middleware, are presently available and in use in backend data processing environments. MQ-Series and RabbitMQ are some examples of commercially available messaging middleware that facilitate such communications between applications (MQ-Series is a trademark of International Business Machines Corporation in the United States and other countries, RabbitMQ is an open source software distributed by Pivotal Software, Inc., under Mozilla Public License).

A messaging middleware allows one or more applications to publish one or more messages for one or more other applications in a message queue. The other applications subscribe to the queue. When a message is published to the queue, all subscribers, or a subset of the subscribers, to the queue can receive the published message. The subset of subscribers that receive a message is determined by a combination of the policies ascribed to the queue and by the message contents themselves.

The set of one or more agent applications maintain a set of service queues. A service queue in the set of service queues is configured to receive publications of requests having only a specific queries. For example, one service queue may be associated with monitoring a particular data in a database, another service queue may be associated with a news feed service, and another service queue may be associated with monitoring an event.

Depending upon the service being requested in a request message query, an agent publishes the request to the service queue associated with that service. Those servers or backend applications, which provide the requested service, subscribe to the service queue for that service.

One of the subscriber backend applications takes up the request from the service queue. That subscriber backend application processes the request and produces a response with the requested content.

An agent determines whether a session queue for the requestor client has already been created in the messaging middleware. A session queue is usable by a server to publish responses that have to be delivered to the client. Whenever a server or backend application has data to send to the client, the server or the backend application publishes that data to the session queue for the client. The client is the ultimate subscriber to the session queue with an agent acting as the intermediary who will forward the message. When data is published to the session queue, the subscribing client receives the data via an agent.

In certain circumstances, a server can create a session queue and publish the response to the queue for delivery to a client. To avoid creating multiple session queues for the same session for the same client, before an agent creates a session queue, the agent checks whether a session queue already exists for the client and the session. If a session queue already exists, the agent simply binds to the existing session queue.

Thus, multiple agents can bind to the same session queue. When a response is posted to the session queue by a server or backend application, any one of the agents that are bound to the queue can send the published response to the subscribing client When a subscribing client does not access a session queue for a queue timeout period, an embodiment purges the queue and the remaining messages therein. If a message is posted to a session queue, and a subscribing client does not pick up or receive the posted message, a message timeout timer purges that posted message from the session queue.

Within the messaging middleware, each server also maintains a server instance queue. The server instance queues are used for communications between the servers. Such internal communications between servers do not maintain any state information about each other.

An exchange is a messaging middleware function. An exchange comprises logic to route messages to queues. A server publishes a message to the exchange in order to have the message published to one or more queues.

For example, a server publishes content to a channel by publishing the content with the channel information to the exchange. The exchange then routes the content of the channel to those session queues that are bound to the exchange to consume messages for that channel.

With this architecture in place, a typical operation using this architecture proceeds as follows—a client sends a subscription request to the server-side. The embodiment determines that the request pertains to a particular channel, e.g., channel Z. If multiple clients request the same query, multiple clients could be requesting subscription to channel Z in this manner.

An agent on the server-side queues the request in a suitable service queue according to the query in the request. From a set of servers that process that query, a server instance—e.g., server 10—picks up the request from the service queue. Server 10 binds the session queue of the requesting client with the exchange for channel Z. In other words, when server 10 publishes content on channel Z to the exchange, the exchange routes and stores the channel Z content in the client's session queue. If more than one client were subscribed to channel Z, then the exchange would route and store the content published on channel Z to the session queues of each such subscribing client in a similar manner.

A server computes the content that is to be published on a channel. The server also computes a content signature.

A content signature is a unique identifier or value associated with the content published in a message from a server. One example content signature is a hash value of the content in a message. The hash value can be computed using any suitable algorithm, seed values, and the like. Another example content signature is a unique identifier associated with the content. The identifier must at least be unique within a channel over a given period.

The server publishes the content and the content signature in a message on a channel. The exchange routes the published message—including the content and the content signature—to one or more session queues of the corresponding one or more subscribing clients.

When there is no update to the previously published content, or a server need not publish an update for any reason, the server publishes a heartbeat message. The heartbeat message includes the content signature associated with the content or an update thereto that was last published from the server on the channel. The exchange routes the heartbeat messages to the subscribing client session queues in the manner of the content publications from the server.

An embodiment implemented on the client-side receives a published message from the client's session queue. If the message contains content or content update, the embodiment saves the content signature and uses the content or the update. The embodiment saves the content signature as the last known content signature, replacing any previously saved content signatures.

If the message is a heartbeat message, the embodiment compares the content signature of the heartbeat message with the last known content signature that was saved in the manner described above. If the content signature of the heartbeat message and the last known content signature match, then the embodiment concludes that the client is in sync with the server and has received all published content and content updates up to the time of the heartbeat message.

If the content signature of the heartbeat message and the last known content signature do not match, then the embodiment concludes that the server has published content or an update corresponding to the content signature of the heartbeat message, and the client has not received that content or update. Accordingly, the embodiment concludes that the client is out of sync with the server and has missed at least one published content or update up to the time of the heartbeat message.

Consequently, the embodiment refreshes the content at the client. For example, one embodiment causes a client application to send a refresh request to the server-side. The client application receives the last published content from the server-side in response to the refresh request, thus bringing the client in sync with the server.

It is possible that a failure on the server-side, e.g., a failure of the middleware, may cause a client to not receive any message at all for a period. An embodiment implemented on the client-side sets a timeout period within which the client should receive some publication from the server on the channel—either a published content or update message or a heartbeat message. The embodiment activates the timeout timer upon receipt of a previous message on the channel. If the embodiment does not receive either of the two possible published messages before the timeout period expires, the embodiment concludes that an error condition exists at the server-side and a corrective action has to be taken at the client. Accordingly, the embodiment re-subscribes to the query of the original request. For example, one embodiment causes a client application to resend the original request with the query. Another embodiment causes a client application to construct and send a new request with the query of the original request.

A method of an embodiment described herein, when implemented to execute on a device or data processing system, comprises substantial advancement of the functionality of that device or data processing system in managing data requests and responses. For example, the prior-art allows the possibility of perpetually waiting client or an out of sync client in the event of a failure on the server-side. In contrast, an embodiment configures and operates a publish-subscribe client-server architecture where the a client can detect a failure on the server-side and take corrective actions such that the messaging between the client and a server can resume without loss of data and without an indefinite wait. Such manner of data request management in publish-subscribe environments is unavailable in presently available devices or data processing systems. Thus, a substantial advancement of such devices or data processing systems by executing a method of an embodiment allows for a fault-tolerant client-side configuration in a publish-subscribe type of messaging environment, which significantly reduces wasteful waiting and/or data loss at the clients.

The illustrative embodiments are described with respect to certain architectures, middleware, protocols, messages, identifiers, signatures, networks, parameters, timeouts, conditions, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures thereof, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 1:
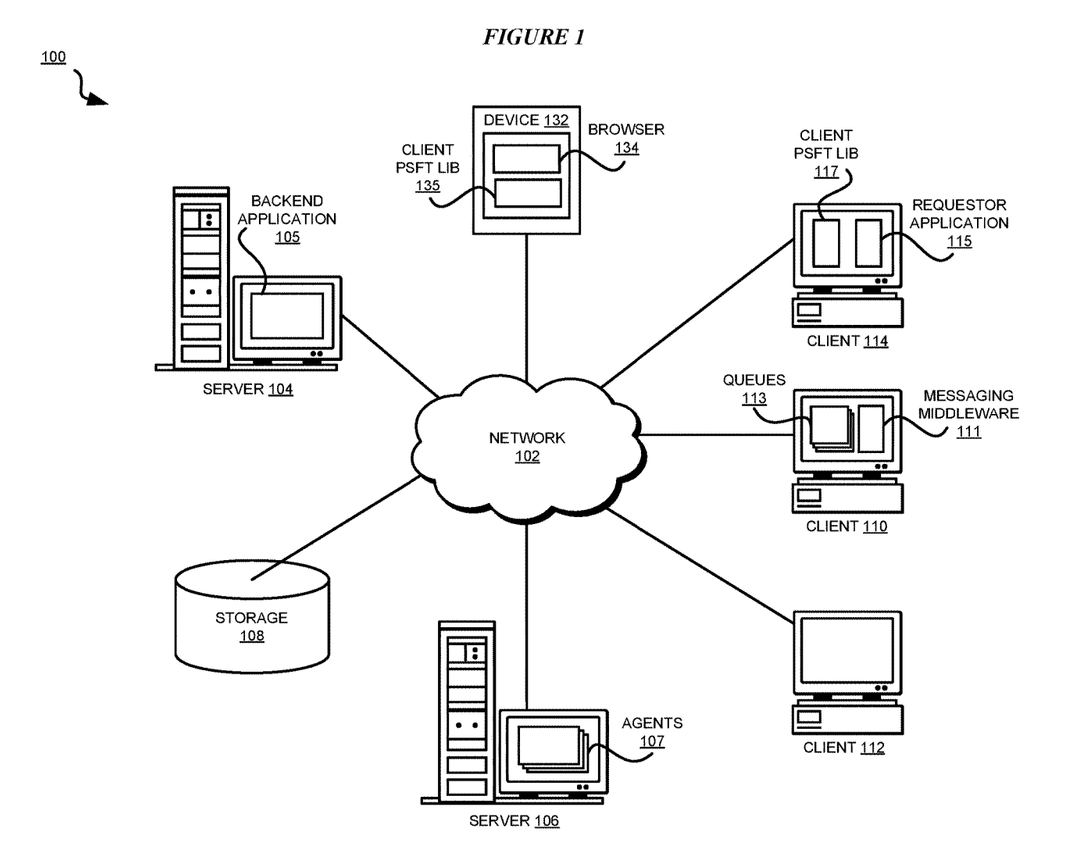
FIG. 1 depicts a block diagram of a network of data processing systems in which illustrative embodiments may be implemented.
Figure 2:
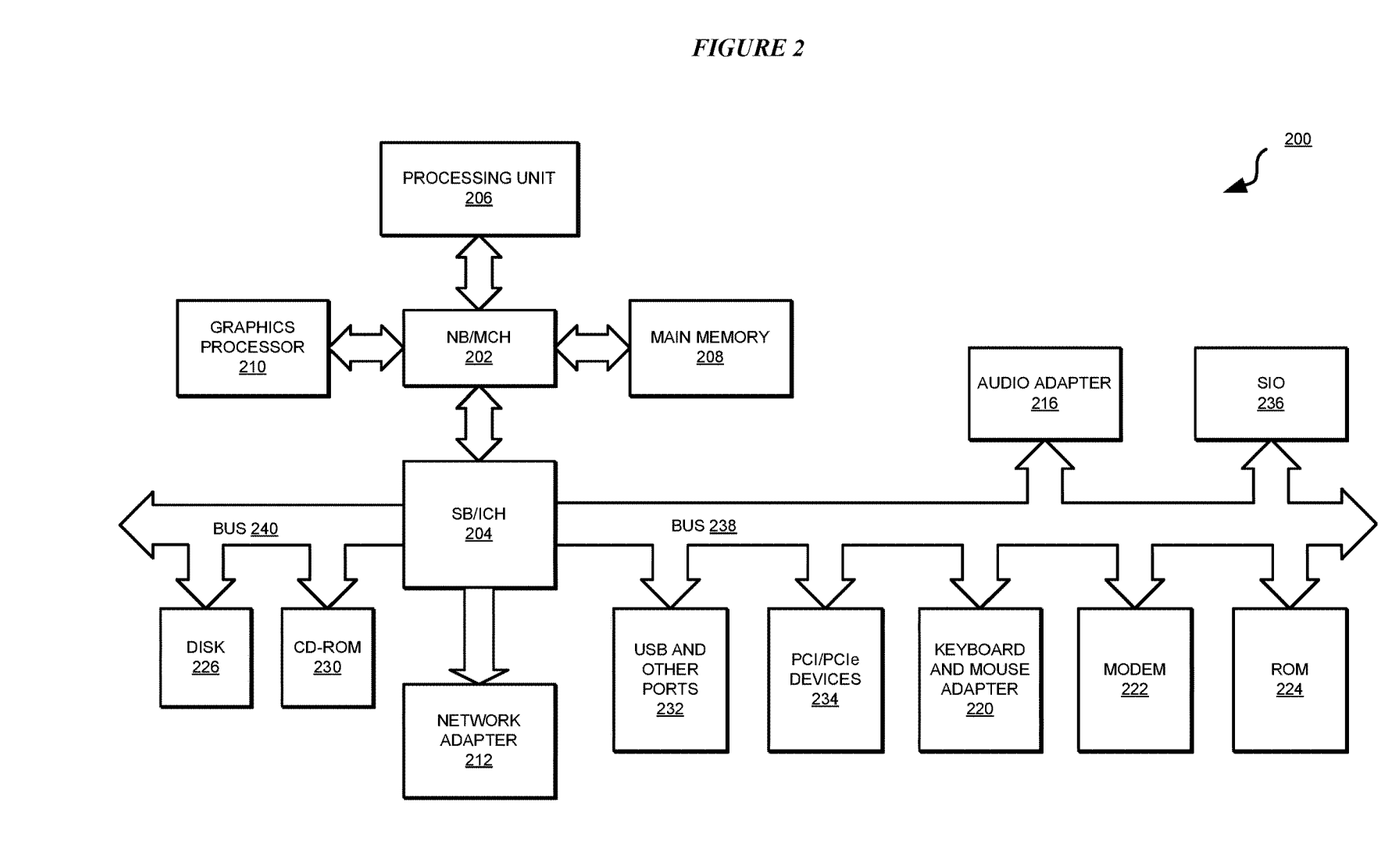
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wired, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner. Within the scope of illustrative embodiments, a server or server instance operating in conjunction with an embodiment comprises backend application 105. Backend application 105 in server 104 comprises any application, including but not limited to a server application or a service application, which responds to a request from a client application. Device 132 is a non-limiting example of a client, and browser 134 in device 132 is a non-limiting example of a client application. Requestor application 115 in client 114 is another example of a client application. Requestor application 115 or browser 134 sends a request to which backend application 105 responds. Library 135 in device 132 and library 117 in client 114 operate as client publish-subscribe fault-tolerant (PSFT) library of functions, and are non-limiting example implementations of one or more embodiments described herein. For example, library 135 can be called from or integrated in client application 134. As another example, library 117 can take the form of an application operating in conjunction with requestor application 115, as described elsewhere in this disclosure. One or more agent applications 107 in server 106 receive the request from client application 115 or 134, queue the request according to the type of service requested, create session queues, and pass responses to client application 115 or 134 as described elsewhere in this disclosure. Messaging middleware 111 provides the queuing and publish-subscribe functionality in the manner described in this disclosure. For example, messaging middleware 111 facilitates the creation and operation of queues 113. A queue in queues 113 may be a service queue (not shown) and another queue in queues 113 may be a session queue (not shown). Messaging middleware 111 also implements an exchange function (not shown), which is usable in the manner described in this disclosure.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also be viewed as employing a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as server 104 or client 110 in FIG. 1, or another type of device in which computer usable program code or instructions implementing the processes may be located for the illustrative embodiments.

Data processing system 200 is also representative of a data processing system or a configuration therein, such as device 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive or solid-state drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system such as AIX® (AIX is a trademark of International Business Machines Corporation in the United States and other countries), Microsoft® Windows® (Microsoft and Windows are trademarks of Microsoft Corporation in the United States and other countries), Linux® (Linux is a trademark of Linus Torvalds in the United States and other countries), iOS™ (iOS is a trademark of Cisco Systems, Inc. licensed to Apple Inc. in the United States and in other countries), or Android™ (Android is a trademark of Google Inc., in the United States and in other countries). An object oriented programming system, such as the Java™ programming system, may run in conjunction with the operating system and provide calls to the operating system from Java™ programs or applications executing on data processing system 200 (Java and all Java-based trademarks and logos are trademarks or registered trademarks of Oracle Corporation and/or its affiliates).

Instructions for the operating system, the object-oriented programming system, and applications or programs, such as agents 107, backend application 105, messaging middleware 111, or libraries 117 or 135 in FIG. 1 are located on storage devices, such as hard disk drive 226 or a solid-state data storage device, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a mobile computing device, which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Figure 3:
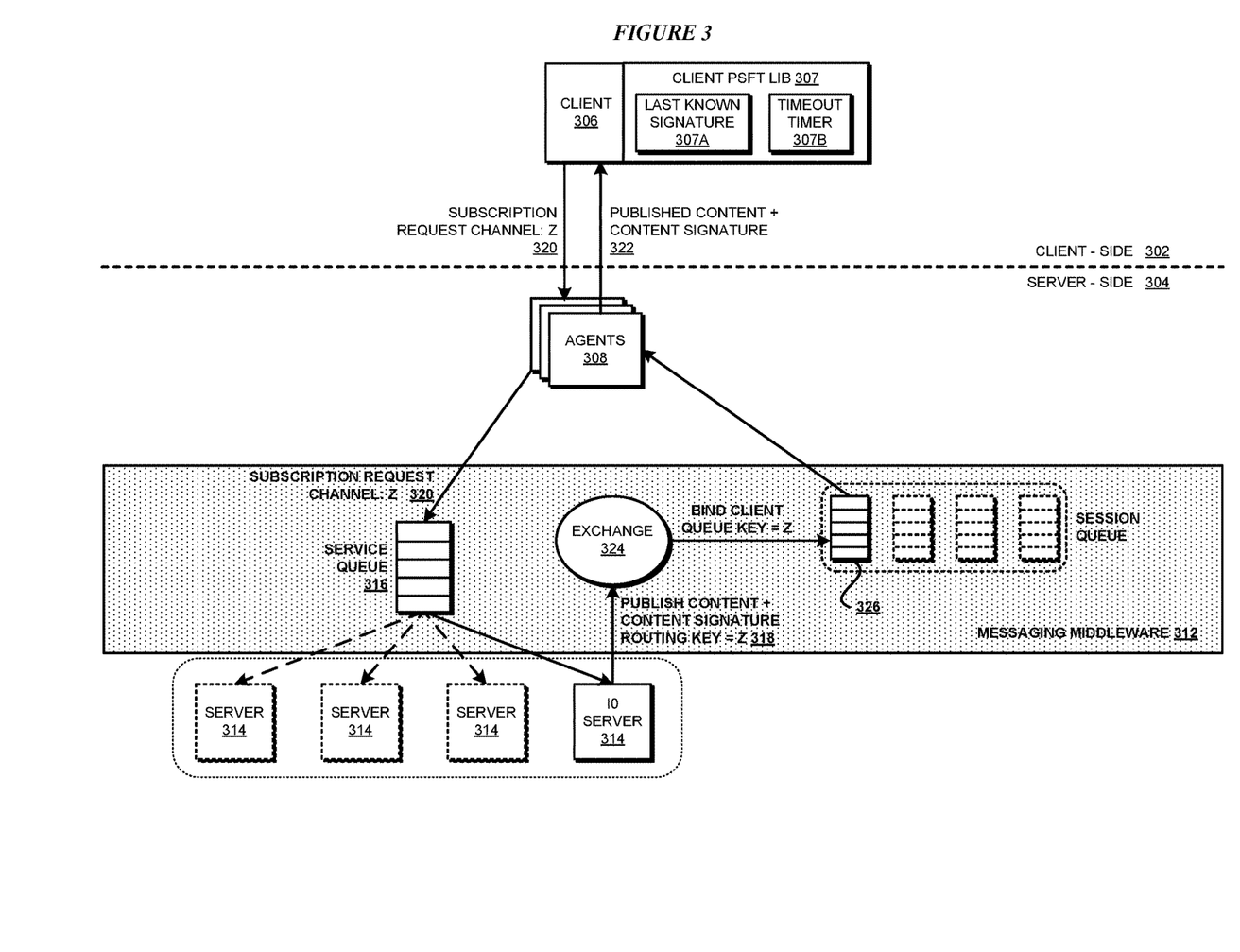
FIG. 3 depicts a block diagram of an example configuration for content publishing in a publish-subscribe client-server environment in accordance with an illustrative embodiment.

With reference to FIG. 3, this figure depicts a block diagram of an example configuration for content publishing in a publish-subscribe client-server environment in accordance with an illustrative embodiment. The dashed line dividing client-side 302 and server-side 304 represents a data network, such as network 102 in FIG. 1. Client-side 302 represents data requestors, such as client application 306 (client application is also interchangeably referred to herein as "client"). Client application 306 is an example of browser 134 or requestor application 115 in FIG. 1. Client application 306 operates in conjunction with client PSFT library 307. Library 307 manages, or enables client application 306 to manage, data structure 307A to store the last known signature. Library 307 manages, or enables client application 306 to manage, timeout timer 307B.

Server-side 304 represents the server-side data processing environment where backend applications and servers that respond to queries in client requests, and other server-side architecture components to support their functions operate. A set of several agents 308 is depicted as an example. An instance of agent 308 is an example of agent 107 in FIG. 1. Optionally, a load balancer (not shown) or another suitable distribution method can be employed to distribute the inbound requests from client-side 302 amongst several agents 308.

Messaging middleware 312 is an example of messaging middleware 111 in FIG. 1. Servers 314 comprise a set of servers, server applications, or backend applications that provide a particular service requested in some client requests. As a non-limiting example, server 314 may operate as redundant or load-sharing servers to provide a database service to process a particular type of query associated with channel Z. Other sets of servers (not shown) may similarly be configured on server-side 304 to provide other services associated with other queries and requests in a similar manner.

Service queue 316 holds those client requests that request the service provided by a server instance in servers 314. For example, client application 306 and other client applications (not shown) may send a subscription request for certain data from a database. An agent from agents 308 receives one such request, identifies the requested service, determines that service queue 316 is associated with the requested service, and posts the request in service queue 316. Servers 314 subscribe to service queue 316. A server from servers 314 detects the posting of the subscription request to service queue 316, and removes that request from service queue 316 for processing.

Note that each of servers 314 operates in a stateless manner. In other words, a server in servers 314 does not maintain any session or state information to have any particular affinity with any particular client application, or another server. A server in servers 314 simply receives a subscription request from service queue 316 and processes the request. The received request can be from any client application executing in any client data processing system.

In operation, client application 306 begins by sending subscription request 320 to server-side 304. Subscription request 320 requests a query that corresponds to a channel, e.g., channel Z. Agent 308 queues request 320 into service queue 316. Server instance 10 from servers 314 receives request 320.

In message 318, server 10 publishes content and a content signature. Server 10 publishes message 318 on exchange 324 with channel Z and also binds session queue 326 of client 306 to exchange 324 as a consumer of channel Z. As an example, server 10 publishes message 318 on exchange 324 by using a routing key with message 318, where the routing key is set to the channel identifier, which in the example here is Z.

Suppose that session queue 326 is associated with client 306. Exchange 324 binds session queue 326 to channel Z. Exchange 324 can bind session queue 326 to any number of different channels for client 306 in a similar manner. Similarly, exchange 324 can bind any number of session queues that are associated with any number of different clients to channel Z and/or any number of different channels in a similar manner.

Server 10 publishes content and content signature, or content updates and content signature, as messages 318 to channel Z. Exchange 324 routes the published content or updates, and the associated content signature, from channel Z to session queue 326, which an agent in agent 308 delivers to client 306. Message 322 includes the published content or update and the associated content signature. Library 307 saves, or causes client application 306 to save, the content signature from message 322 in data structure 307A. Library 307 activates, or causes client application 306 to activate, timeout timer 307B.

Figure 4:
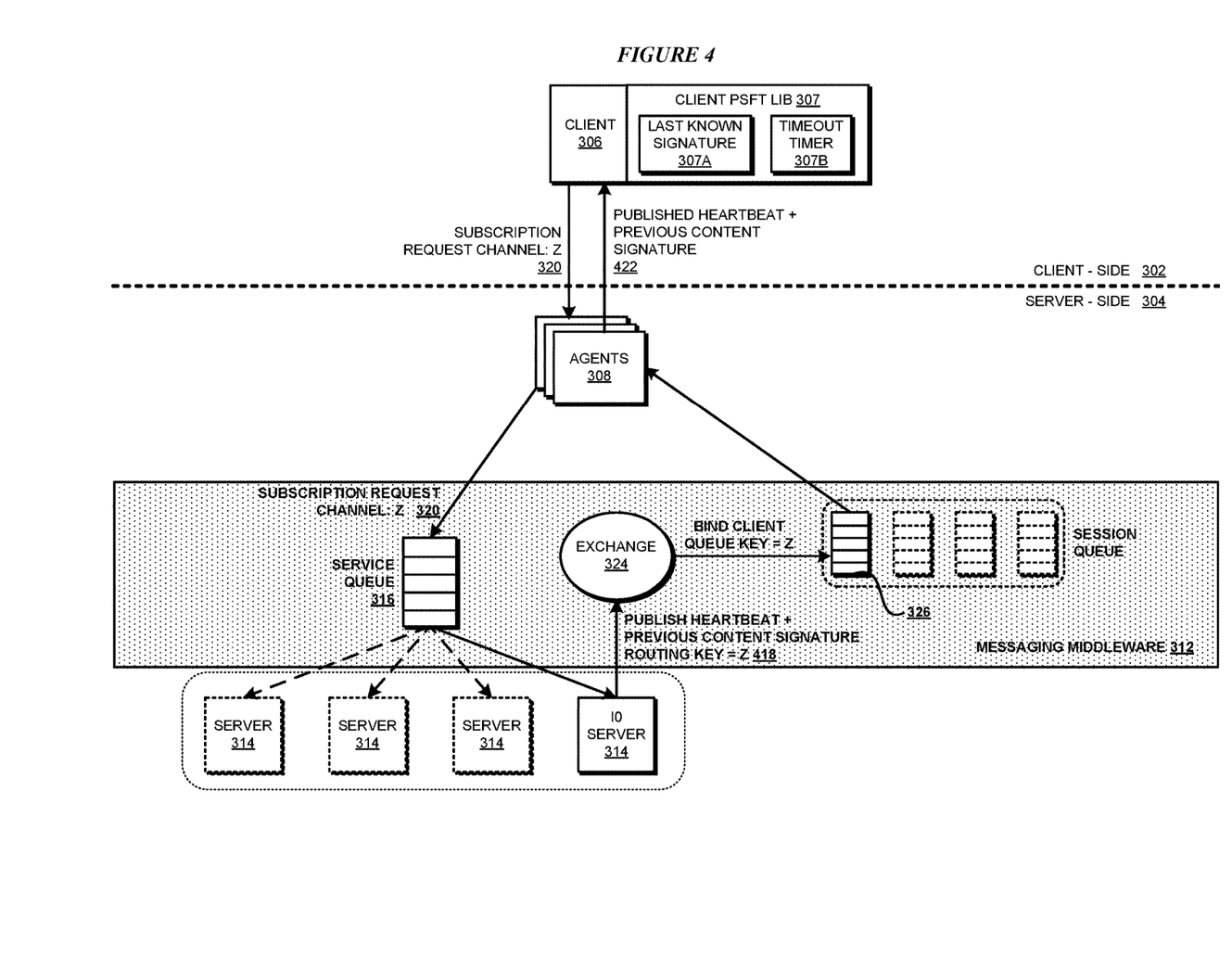
FIG. 4 depicts a block diagram of content publication for client-side fault-tolerance in a publish-subscribe system in accordance with an illustrative embodiment.

With reference to FIG. 4, this figure depicts a block diagram of content publication for client-side fault-tolerance in a publish-subscribe system in accordance with an illustrative embodiment. Depicted artifacts with reference numerals reused from FIG. 3 are the same artifacts as described with respect to FIG. 3.

In operation, there may be circumstances when server instance 10 from servers 314 may not have any content or content update to publish to channel Z. Periodically, during such circumstances, server 10 publishes heartbeat and the content signature last sent on channel Z, as message 418. A heartbeat message is sufficient information to communicate that the server is alive and functioning. Server 10 publishes message 418 on exchange 324 with channel Z in the same manner as message 318.

Exchange 324 routes message 418 from channel Z to session queue 326, which an agent in agent 308 delivers to client 306. Message 422 includes the published heartbeat and the content signature that server 10 last used on channel Z. Library 307 compares, or causes client application 306 to compare, the content signature from message 422 with the last known content signature saved in data structure 307A. Library 307 activates, or causes client application 306 to activate, timeout timer 307B.

Figure 5:
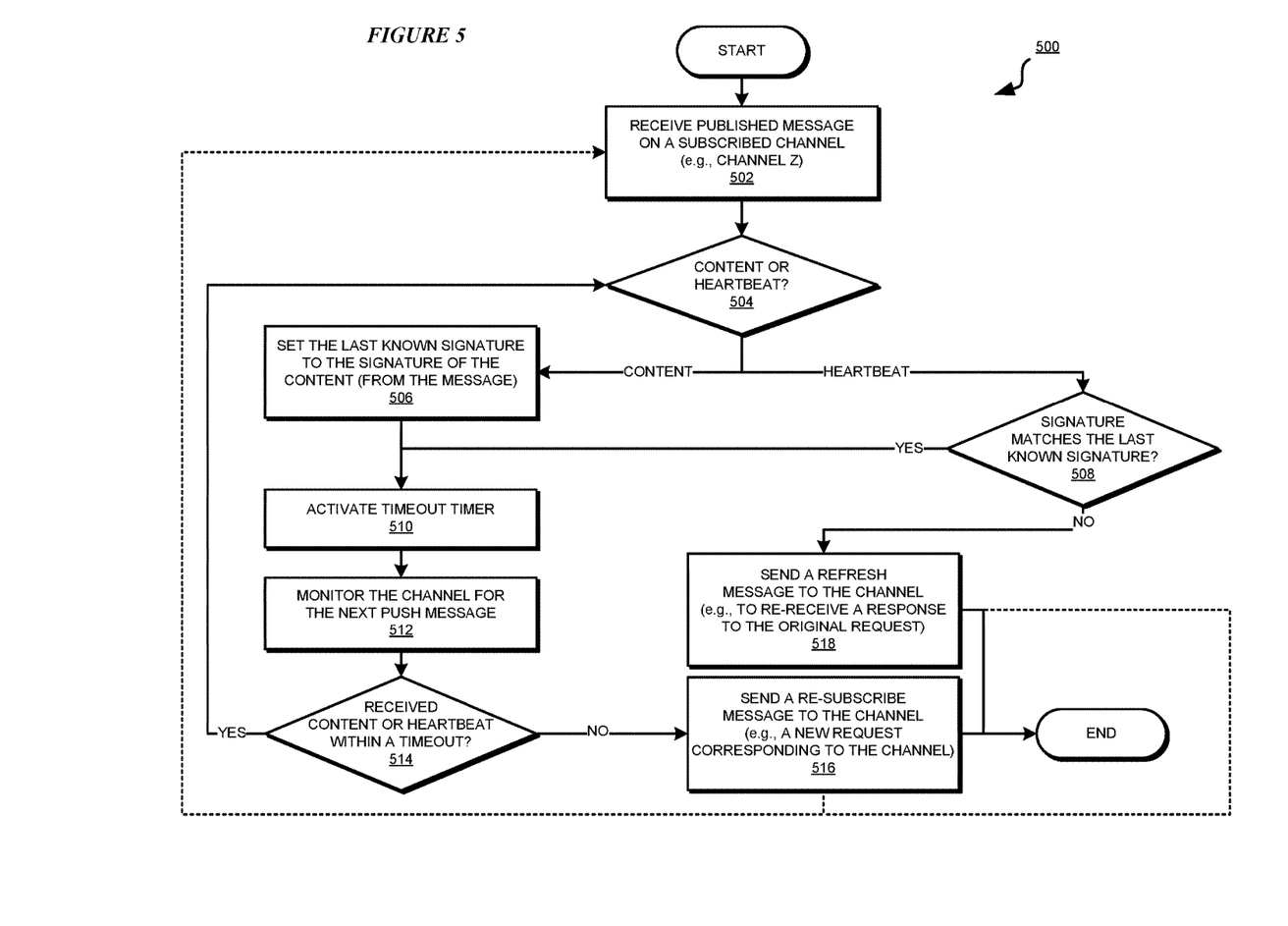
FIG. 5 depicts a flowchart of an example process for client-side fault-tolerance in a publish-subscribe system in accordance with an illustrative embodiment.

With reference to FIG. 5, this figure depicts a flowchart of an example process for client-side fault-tolerance in a publish-subscribe system in accordance with an illustrative embodiment. Process 500 can be implemented in library 307 in FIG. 3 or an application implementing similar functions.

The application receives a published message on a subscribed channel, such as on channel Z as used in the above examples (block 502). The application determines whether the published message carries content or a heartbeat (block 504).

If the message carries content ("Content" path of block 504), the application sets the last known signature to the content signature in the message, which is a signature corresponding to the content in the message (block 506). The application then proceeds to block 510.

If the message carries a heartbeat ("Heartbeat" path of block 504), the application determines whether the content signature carried with the heartbeat matches the content signature saved in a last known content signature data structure (block 508). If the content signature carried with the heartbeat matches the content signature saved in a last known content signature data structure ("Yes" path of block 508), the application activates a timeout timer (block 510). The application monitors the channel for a push message, e.g., a message with content update or another heartbeat (block 512).

The application determines whether a message carrying content update or heartbeat has been received within the timeout timer's period (block 514). If a message has been received before the timeout timer expires ("Yes" path of block 514), the application returns to block 504 and processes the message.

If a message has not been received before the timeout timer expires ("No" path of block 514), the application sends a re-subscribe message to the channel, such as by sending a request for the query corresponding to the channel (block 516). The application ends process 500 thereafter, or returns to block 502 for receiving and processing a message in response to the re-subscription.

At block 508, if the content signature carried with the heartbeat does not match the content signature saved in a last known content signature data structure ("No" path of block 508), the application sends a refresh message to the channel (block 518). The application ends process 500 thereafter, or returns to block 502 for receiving and processing a message in response to the re-subscription.

The illustrative embodiments have been described using certain examples messages only for the clarity of the description and not as a limitation on the illustrative embodiments. From this disclosure, those of ordinary skill in the art will recognize that the illustrative embodiments described herein are agnostic to the specific transport protocol used to communicate requests and responses between clients and servers, and can be adapted to operate with HTTP or other protocols, and the same is contemplated within the scope of the illustrative embodiments.

Thus, a computer implemented method, system or apparatus, and computer program product are provided in the illustrative embodiments for client-side fault-tolerance in a publish-subscribe system. Where an embodiment or a portion thereof is described with respect to a type of device, the computer implemented method, system or apparatus, the computer program product, or a portion thereof, are adapted or configured for use with a suitable and comparable manifestation of that type of device.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for client-side fault-tolerance in a publish-subscribe system, the method comprising:
saving a last known content signature from a previous message when the previous message is received on a channel at a server;
receiving, on the channel, a message from the server;
determining, at a function executing using a processor and a memory, whether the message contains a heartbeat data, wherein the message includes a content signature;
determining, responsive to the message containing the heartbeat data, whether a client is in sync with the server for a content published by the server by determining whether the content signature contained in the message matches the last known content signature; and
sending, responsive to the content signature contained in the message not matching the last known content signature, a refresh message to the channel, the refresh message causing a response to an original request to be re-received on the channel.

2. The method of claim 1, further comprising:
receiving an other message after the message;
determining that the other message carries content and a corresponding content signature; and
saving the content signature of the other message as the last known content signature.

3. The method of claim 1, wherein the content signature contained in the message comprises a content signature used by the server in a last message that carried content, wherein the content is responsive to a request, and wherein the heartbeat data is not responsive to the request.

4. The method of claim 1, further comprising:
activating a timeout timer upon receiving the previous message;
determining that the message has been received on the channel prior to the timeout timer expiring; and
resetting and reactivating the timeout timer upon receiving the message.

5. The method of claim 1, further comprising:
activating a timeout timer upon receiving an other message; and
re-subscribing to the channel, responsive to the timeout timer expiring prior to receiving a next message subsequent to the other message.

6. The method of claim 1, further comprising:
clearing, responsive to sending the refresh message, the last known content signature from the previous message.

7. The method of claim 1, further comprising:
receiving, responsive to the refresh message, a response message; and
setting the last known content signature with a content signature contained in the response message.

8. The method of claim 1, further comprising:
activating a timeout timer upon receiving the response message;
receiving, prior to the timeout timer expiring, a next message subsequent to the response message;
determining that the next message carries a second heartbeat data;
determining that a second content signature contained in the next message matches the last known content signature saved from the response message; and
resetting and reactivating the timeout timer upon receiving the next message.

9. The method of claim 8, further comprising:
monitoring the channel for a content update from the server.

10. A computer usable program product comprising a computer readable storage device including computer usable code for client-side fault-tolerance in a publish-subscribe system, the computer usable code comprising:
computer usable code for saving a last known content signature from a previous message when the previous message is received on a channel at a server;
computer usable code for receiving, on the channel, a message from the server;
computer usable code for determining, at a function executing using a processor and a memory, whether the message contains a heartbeat data, wherein the message includes a content signature;
computer usable code for determining, responsive to the message containing the heartbeat data, whether a client is in sync with the server for a content published by the server by determining whether the content signature contained in the message matches the last known content signature; and
computer usable code for sending, responsive to the content signature contained in the message not matching the last known content signature, a refresh message to the channel, the refresh message causing a response to an original request to be re-received on the channel.

11. The computer usable program product of claim 10, further comprising:
computer usable code for receiving an other message after the message;
computer usable code for determining that the other message carries content and a corresponding content signature; and
computer usable code for saving the content signature of the other message as the last known content signature.

12. The computer usable program product of claim 10, wherein the content signature contained in the message comprises a content signature used by the server in a last message that carried content, wherein the content is responsive to a request, and wherein the heartbeat data is not responsive to the request.

13. The computer usable program product of claim 10, further comprising:
computer usable code for activating a timeout timer upon receiving the previous message;
computer usable code for determining that the message has been received on the channel prior to the timeout timer expiring; and
computer usable code for resetting and reactivating the timeout timer upon receiving the message.

14. The computer usable program product of claim 10, further comprising:
computer usable code for activating a timeout timer upon receiving an other message; and
computer usable code for re-subscribing to the channel, responsive to the timeout timer expiring prior to receiving a next message subsequent to the other message.

15. The computer usable program product of claim 10, further comprising:
computer usable code for clearing, responsive to sending the refresh message, the last known content signature from the previous message.

16. The computer usable program product of claim 10, further comprising:
computer usable code for receiving, responsive to the refresh message, a response message; and
computer usable code for setting the last known content signature with a content signature contained in the response message.

17. The computer usable program product of claim 10, further comprising:
computer usable code for activating a timeout timer upon receiving the response message;
computer usable code for receiving, prior to the timeout timer expiring, a next message subsequent to the response message;
computer usable code for determining that the next message carries a second heartbeat data;
determining that a second content signature contained in the next message matches the last known content signature saved from the response message; and
computer usable code for resetting and reactivating the timeout timer upon receiving the next message.

18. The computer usable program product of claim 10, wherein the computer usable code is stored in a computer readable storage device in a data processing system, and wherein the computer usable code is transferred over a network from a remote data processing system.

19. The computer usable program product of claim 10, wherein the computer usable code is stored in a computer readable storage device in a server data processing system, and wherein the computer usable code is downloaded over a network to a remote data processing system for use in a computer readable storage device associated with the remote data processing system.

20. A data processing system for client-side fault-tolerance in a publish-subscribe system, the data processing system comprising:
a storage device, wherein the storage device stores computer usable program code; and
a processor, wherein the processor executes the computer usable program code, and wherein the computer usable program code comprises:

computer usable code for saving a last known content signature from a previous message when the previous message is received on a channel at a server;

computer usable code for receiving, on the channel, a message from the server;

computer usable code for determining, at a function executing using a processor and a memory, whether the message contains a heartbeat data, wherein the message includes a content signature;

computer usable code for determining, responsive to the message containing the heartbeat data, whether a client is in sync with the server for a content published by the server by determining whether the content signature contained in the message matches the last known content signature; and computer usable code for sending, responsive to the content signature contained in the message not matching the last known content signature, a refresh message to the channel, the refresh message causing a response to an original request to be re-received on the channel.

* * * * *